United States Patent

[11] 3,601,582

| [72] | Inventor | Jean De Boisfleury<br>Plombieres-les-Bains, France |
|---|---|---|
| [21] | Appl. No. | 843,933 |
| [22] | Filed | July 23, 1969 |
| [45] | Patented | Aug. 24, 1971 |
| [73] | Assignee | Iseco S. A.<br>Plombieres-les-Bains, France |
| [32] | Priority | July 24, 1968 |
| [33] | | France |
| [31] | | 160 407 |

[54] APPARATUS FOR REHEATING PORTIONS OF COOKED FOOD
12 Claims, 10 Drawing Figs.

[52] U.S. Cl. .................................................. 219/388,
99/331, 219/411, 219/412, 219/405, 219/347, 219/553
[51] Int. Cl. .................................................. F27b 9/06
[50] Field of Search .................................. 219/420,
405, 388, 411–12, 553, 347, 343, 354; 99/386,
443 C, 331; 107/57; 263/8

[56] References Cited
UNITED STATES PATENTS

| 3,239,651 | 3/1966 | Silberman | 219/388 |
|---|---|---|---|
| 3,244,859 | 4/1966 | Whiteford | 219/405 X |
| 3,400,651 | 9/1968 | Hatch | 99/331 |
| 3,448,678 | 6/1969 | Burstein | 99/386 |
| 2,864,932 | 12/1958 | Forrer | 219/400 X |
| 3,119,355 | 1/1964 | Gawlitza et al. | 107/57 |
| 3,152,243 | 10/1964 | Andrews | 219/405 |
| 3,171,945 | 3/1965 | Meng et al. | 219/347 |
| 3,249,741 | 5/1966 | Mills | 219/388 |
| 3,304,406 | 2/1967 | King | 219/411 |
| 3,346,723 | 10/1967 | Mohn et al. | 219/553 |
| 3,414,709 | 12/1968 | Tricault | 219/411 |

*Primary Examiner*—Volodymyr Y. Mayewsky
*Attorney*—Breitenfeld & Levine

ABSTRACT: An apparatus for reheating cooked food portions, having an oven, electric infrared ray emitters mounted within said oven, containers for accommodating the food portions and support means within said oven for holding said containers. These emitters are encased tubes arranged to form heating grills and placed above and below the containers. The heating is in the form of a timed heating cycle with periods of heating when the containers are subjected to the heating effect of the emitters and at least one stabilization period in which the intensity of heating is reduced to equlize the temperature prevailing inside the containers.

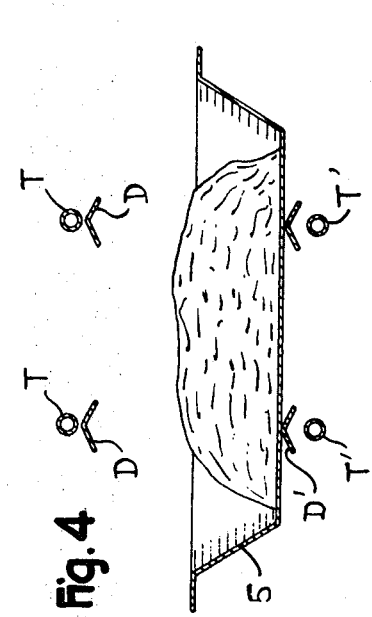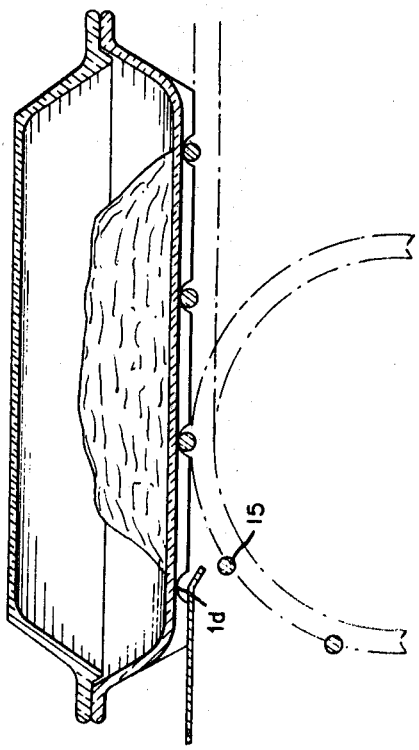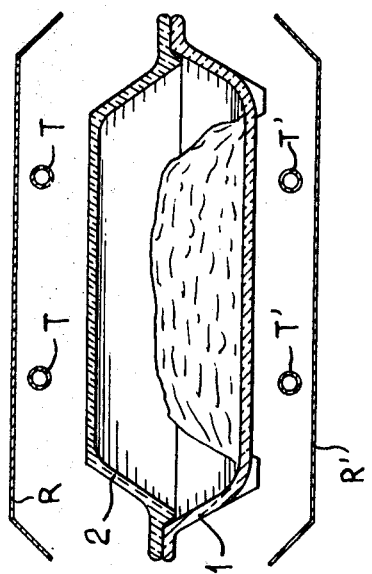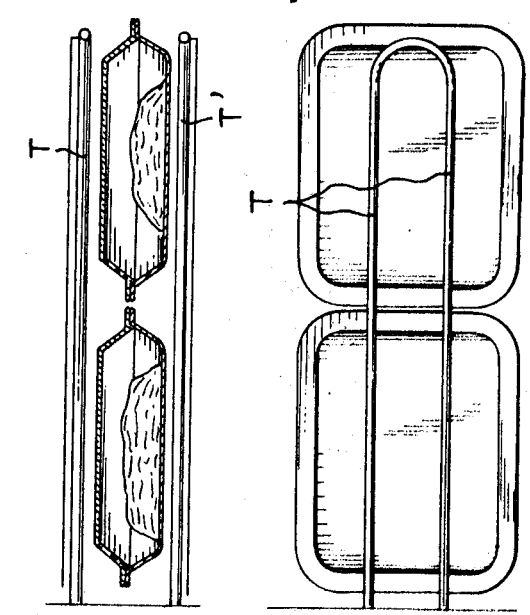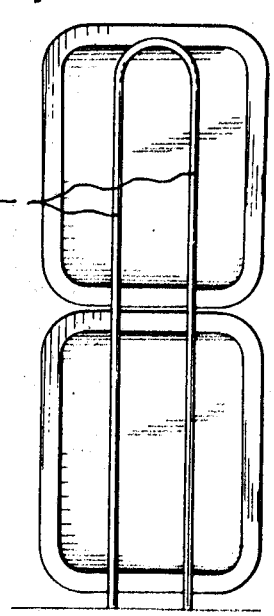

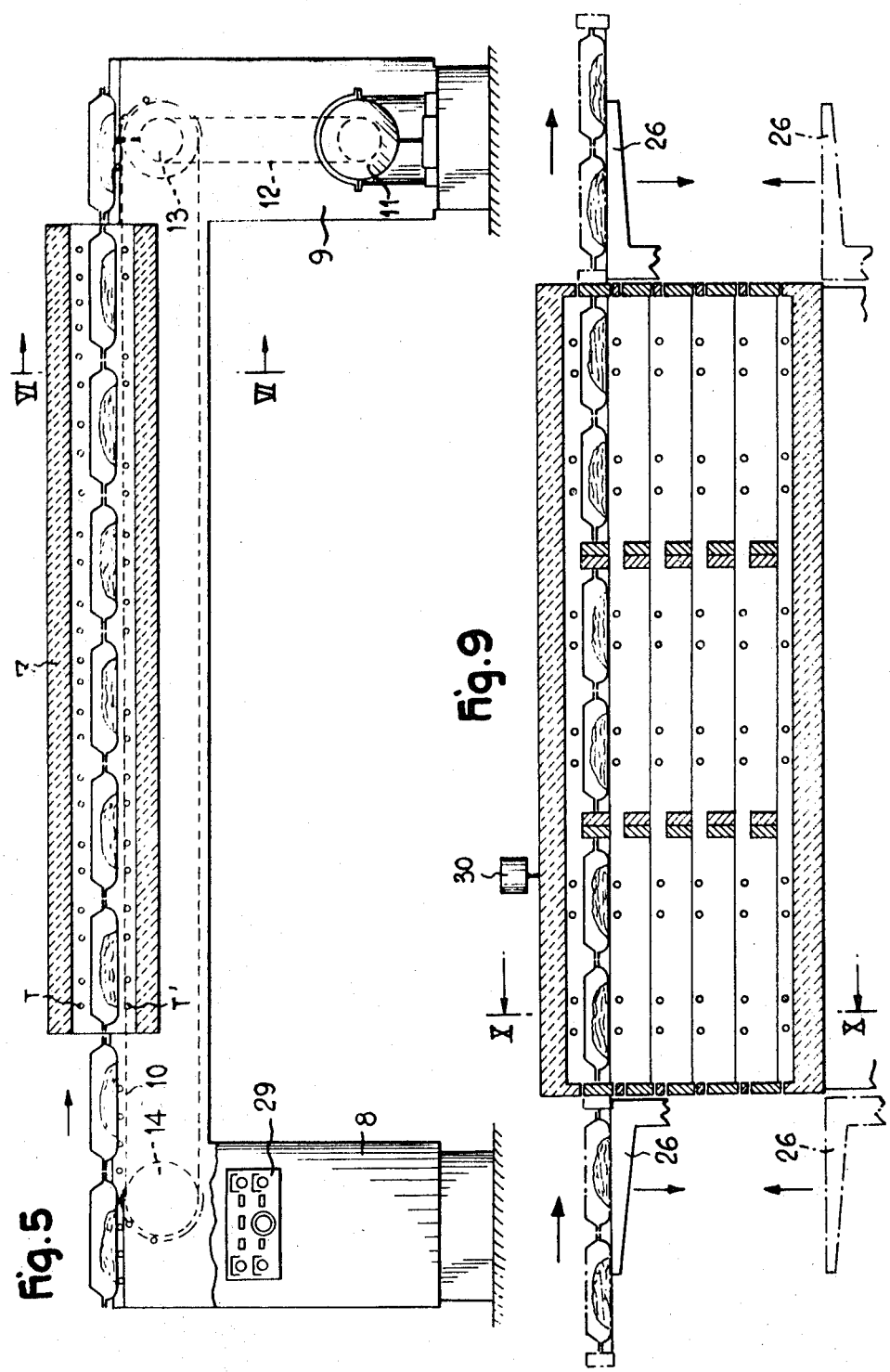

INVENTOR:
JEAN DE BOISFLEURY

By
Breitenfeld & Levine
ATTORNEYS

APPARATUS FOR REHEATING PORTIONS OF COOKED FOOD

This invention relates to improvements in processes and appliances for reheating portions of food.

The idea of reheating certain foods after transportation and periods of delay is by no means new. Contemporary living with its twenty-four-hour day and the development of large communities in education, industry and medicine, with or without automatic food-dispensing facilities, has resulted in the development of this principle of reheating on a large scale for most of the usual dishes.

Reheating should be applicable either to portions that are still warm, having been cooked only a few hours beforehand, or to portions that have been cooked several hours or even several days beforehand, being cold or at the refrigeration temperature or even deep frozen.

The present invention is grouped in the category of known methods and materials in which the plates or dishes to be reheated are subjected to the heating action of tubes which emit infrared rays arranged above and below the aforementioned plates or dishes.

In all these processes, the final result is far from satisfactory insofar as, depending on circumstances, the preparations or portions of food are either exposed to local desiccation or overheating. If it is desired to avoid these deficiencies by the protection of any type of cover and by reducing the intensity of radiation, the amount of time required for adequate reheating is inevitably increased to around 15 minutes in normal cases which is too long to be compatible with the output required from automatic food dispensers in large communities, or with the speed of preparation required in contemporary catering and in the installations, domestic or otherwise, adapted to the rhythm of modern living.

The object of the present invention is to heat food preparations to the temperature at which they are consumed in a much shorter period, that is to say in approximately 6 minutes for a garnished dish at 15° with much greater uniformity throughout the portion and without in any way affecting its taste, i.e. without desiccation or overcooking.

According to the invention, this object is achieved by virtue of the fact that the emitters are in the form of encased tubular elements which are brought together and which are arranged in such a way as to form heating grills, by virtue of the fact that these grills are arranged at a distance of from 10 to 25 mm. above and beneath the container and by virtue of the fact that each portion of food undergoes a programmed heating cycle comprising a heating period during which the container accommodating the portion is exposed to the heating effect of the emitters, alternating with at least one stabilization period during which this effect is at least reduced in intensity to equalize the temperatures prevailing inside the container.

The program can be obtained by interrupting or reducing the emission of at least some, preferably most, of the emitters during the stabilization period, for example by means of a timing mechanism controlling switches or by means of a temperature-sensitive device, for example of the Simmerstat type, and/or by displacing the containers relative to the grills formed by the emitters whose lengths and intervals are thus suitably selected along the path followed by the containers. Excellent results are obtained with stabilization periods each lasting between 10 and 60 seconds, the heating periods being at least equal in duration. It is advisable to proceed in such a way that each heating period is equal or shorter in duration than the preceding heating period, the first heating period lasting for some 2 to 4 minutes, while the stabilization period decreases in duration from 45 to 15 seconds.

Embodiments of the apparatus for carrying out the process according to the invention are described in the following with reference to the accompanying drawings, wherein:

FIG. 1 shows, in section through a vertical plane perpendicular to the axis of the tubes, a plate and a cover of the thick type mounted between tubes emitting infrared rays.

FIG. 2 is a simplified view on a smaller scale of the arrangement shown in FIGURE 1 through a vertical plane through the axis of the tubes.

FIG. 3 is a simplified plan view on a smaller scale of the arrangement shown in FIGURE 2.

FIG. 4 shows an embodiment comprising a plate of the "thin" type arranged between tubes emitting infrared rays, in section through a vertical plane perpendicular to the axis of the tubes.

Figure 6:
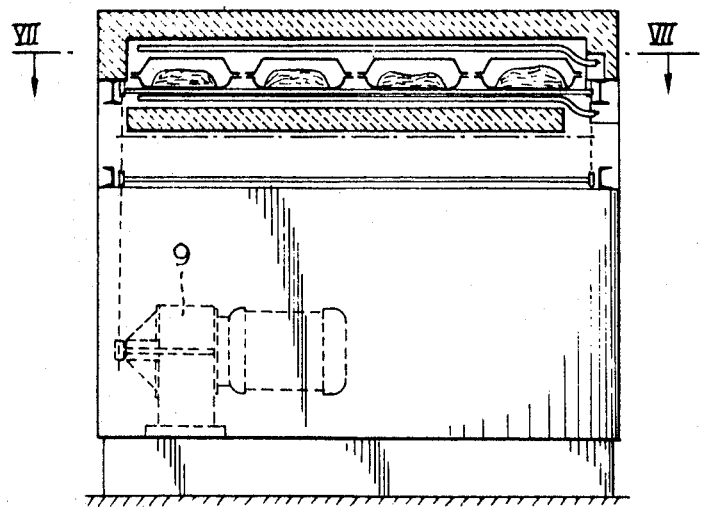
Figure 7:
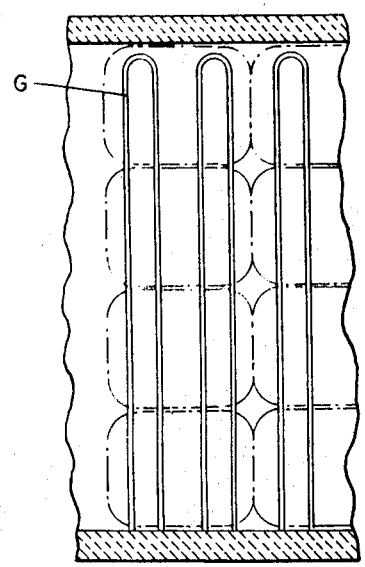

FIGS. 5 to 7 shown a tunnel oven according to the invention as seen respectively in longitudinal section, in section on the plane VI—VI of FIGURE 5 and in a partial view along the plane VII—VII of FIGURE 6.

FIG. 8 is a partial view on a larger scale of a detail of the tunnel or tubular oven.

Figure 10:
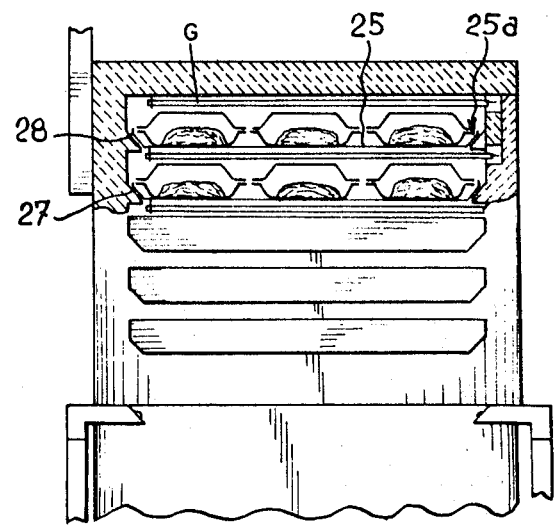

FIGS. 9 and 10 illustrate a modification of the tunnel oven according to the invention comprising several stages, as seen respectively in longitudinal section and in section along the plane X—X of FIGURE 9, with a partial view in the direction of arrow F of FIG. 9.

The containers accommodating the portions comprise plates or dishes and optionally covers.

The plates which may either be made of metal or, more generally, of a thick ceramic material and which are usually circular although they may assume any other more functional shape, are generally covered for reheating with flat or dished covers whose constituent material may be selected to meet particular requirements. Preferably, they have considerable thermal inertia not only to retain heat after reheating but also to promote the timed or programmed heating process according to the invention, as indicated in the following.

The special types of glass that are resistant to thermal shock are among the most suitable types of material for these covers. The plates themselves may be made from these heat-resistant types of glass.

In a modification which is particularly suitable for the automatic dispensing of foods where the plates carrying cold cooked portions have to be light in weight and transportable under safe conditions, the covers may be replaced by films of transparent paper of the crystalline or sulphurized type, or of cellophane. In this case, the plates made of ceramics, metals or even a disposable lightweight material such as cardboard are provided with specially shaped edges so that the film can be stretched over the plate.

The plates and their covers are placed between the heating elements emitting infrared rays.

According to the invention, the elements emitting infrared rays are preferably in the form of metal tubes of small diameter arranged in parallel planes fairly close to one another, that is to say at intervals of from 30 to 70 mm. The tubes are preferably in the form of a U or M with arms arranged at the same intervals which together form a grill G. These grills are placed a short distance, i.e. 15 to 25 mm., below the bottom of the plates and above the covers protecting the portions.

FIGURES 1 to 3 diagrammatically illustrate an arrangement in which the heating tubes T and T' are U-tubes arranged in the form of a hairpin. Reflectors R and R' are arranged above the elements which heat through the cover and beneath the elements which heat through the plate in order to reflect towards the cover and plate, respectively, the rays which would otherwise miss the cover and the plate in question.

In cases where covers and/or plates of cellulose film capable of being carbonized from a certain temperature are used, special provisions have to be made regarding the power of the heating elements and the regularity of the heating periods, in the form of metal deflectors D,D' (FIG. 4) placed respectively between the cover and the elements which heat it and between the plate and the elements which heat it, diminishing the intensity of radiation in the direction closest to the paper. The same applies in cases where no cover is present.

The emitter tubes arranged above the covers are preferably of the encased type heated by internal electrical resistance of such power that the output reaches from 3.5 to 4.5 watts per square centimeter of outer surface, with the result that normally the casing is heated to a temperature of from 700° to 800° C.

These conditions are also suitable for the tubes arranged beneath plates of glazed earthenware or metal.

In cases where the plates to be heated are arranged in multiple-stage ovens in drawers or on shelves of metal wire, heating grills like those described above are arranged above and beneath the set of drawers or shelves with other provided between all the stages.

Inspite of the improvement in the distribution of heat obtained by the grill-like arrangement of the heating elements it is not possible regularly to heat the plates and their contents in cases where it is desired to complete the operation over a short period, that is to say in less than about 8 minutes. In this case, overcooking, desiccation or even roasting occurs at those points closest to the resistances.

It is with the object of obviating these serious disadvantages and completing the operation over a period of from 5 to 7 minutes that the present invention proposes to provide periods during which the heating is switched off, for example lasting from 15 to 60 seconds, alternating with the heating periods of equal or longer duration.

The result is even better when the periods of heating and those during which the heat is switched off follow a rational or experimentally determined program comprising for example heating periods of 3 minutes, 2 minutes and 1 minute, the periods during which the heat is switched off each lasting 30 seconds for example.

The periodic or programmed heating is obtained

—in tunnel ovens through which the containers pass continuously, either by a transverse arrangement of the heating elements and by distributing these elements along the tunnel so that by following one another they automatically complete the desired program which may either be similar or different for the upper or lower heating grills, —or in a batch-type oven containing only one load of plates by means of an electrical switch in the circuits of the heating elements controlled by a programmed timer or other programming device, —or in batch-type tunnel ovens containing several loads of plates by means of a general switch actuated by a control element causing regular periods of heating and cooling of the required duration.

By combining the special provisions described above, name transparent covers, encased heating elements arranged in the form of a grill and heated to a temperature approaching red heat, heating switched off according to program, it is possible to apply an electrical heating intensity of from 900 to 100 watts per plate of normal dimensions, i.e. 23 cm. in diameter for circular plates or approximately 25 x 20 cm. for rectangular plates, without either desiccating or overcooking the dishes in question. The duration for which the plates are kept in the oven may thus be reduced to around 6 minutes for portions placed in the oven at room temperature, i.e. around 15° C.

With these thick-glass covers, the temperatures prevailing inside the portion are equalized over a period of some 2 minutes after leaving the oven and maintained for at least 5 minutes before serving.

In the other possible cases: food preparations kept warm or stored in a deep-frozen state beforehand, it is always possible to obtain adequate reheating by influencing the total duration of the treatment, the program of breaks in heating and optionally, either by rheostat or simmerstat, by a 10 to 40 percent reduction in the electrical power of the heating elements.

There will now be described various examples of reheating ovens embodying the teaching of the invention.

FIGURES 5 to 7 illustrate a tunnel oven through which plates pass continuously and in which the upper and lower heating elements T and T' are arranged transversely and distributed in such a way as to complete automatically a suitable heating program. In this case, the endless chain of bars which carries and displaces the plates is wide enough to accommodate four rectangular plates. The oven which is long enough to accommodate six plates contains 24 plates and can treat up to 240 cold plates at 15° C. per hour.

This oven represents one application of the present invention to the tunnel oven which applicants have been marketing since 1960 under the name "INFRA-PAS."

It comprises a tunnel 7 which has an inlet block 8 and an outlet block 9. An endless conveyor belt 10 which passes around a driven pulley 13 and a return pulley 14 and which is driven by a motor 11 and a transmission chain 12 carries all the plate-cover units from the inlet block to the outlet block through the tunnel.

The belt comprises transverse wires or bars 15, the intervals between which correspond to the intervals between bosses 1d with which the bottoms of the plates are provided on two sides, enabling the plates to be engaged by the chain, as can best be seen in FIG. 8. In FIG. 5, the reference 29 denotes controlled means for interrupting the feed of the emitters.

FIGS. 9 and 10 shows a large capacity tunnel oven. In this case, the plates are arranged in groups of six on perforated supports 25 by which they are also handled in the operations and carriage from the kitchen to the reheating stations and from there to the distribution stations. These supports are arranged in the oven on ramps 27 optionally equipped with rollers 28 for the supports which rest on these ramps by means of an inclined edge 25a.

The supports are superposed in 5 stages and lengthwise 3 supports may be arranged on each stage, the movement of the supports on each stage taking place independently of the other stages. To this end, the two ends of the oven are provided with service tables 26 synchronized in their upward or downward movements either by electrical or pneumatic means, and controlled by pushbutton located level with the required stage so that a cold plate is admitted and a hotplate discharged in a single operation, the supports being pushed together by a mechanical pusher.

This oven comprises a feed zone constituting about one-third of its entire length in which the heating elements are continuously in action. In the following two-thirds of the oven, the elements are in the circuit of a general switch diagrammatically illustrated at 30 controlling a regular rhythm, for example 30 seconds for the heating periods and 15 seconds for the period during which heating is switched off, without any strict synchronization with the movements of the supports which have only been indicated, for each stage by a timing mechanism.

What I claim is:

1. an apparatus for reheating a cooked food portion, comprising an oven having walls resistant to thermoconduction and having opening means through which food containers can be introduced into and withdrawn from the oven, infrared ray emitters mounted within said oven and adapted for connection to a source of electrical power, a container for accommodating the food portion, support means within said oven for holding said container, said container being made of a material in the class consisting of ceramic, glass, and metal, and having thick walls, said emitters being encased tubular elements each comprising at least one straight arm or branch which are arranged parallel to one another so as to form heating grills, said branches being spaced at intervals of from 40 to 70 mm. apart, said grills being situated at distances of from 10 to 25 mm. above and below said container, and programming means to develop a programmed heating cycle comprising at least one stabilization period wherein the heating effect of said emitters on said container is at least reduced, the temperatures within said container tending to equalize during said stabilization period, thus preventing overcooking and desiccation of the food portion.

2. An apparatus as claimed in claim 1, in which metal deflectors are arranged between said containers and those of said tubular elements arranged above them to reduce the direct action of the heat rays in the vertical directions whilst permitting the propagation of oblique infrared rays.

3. An apparatus as claimed in claim 1, in which said containers are arranged in several stages on shelves formed by metal bars, said heating means being placed below the lower stage, above the upper stage and also between the stages.

4. An apparatus as claimed in claim 1, in which said oven is a tunnel oven with an inlet end and an outlet end, and said support means is an endless chain conveyor for moving the containers from the inlet end to the outlet end of the oven, said branches of said emitters being arranged transversely of the direction of this movement.

5. An apparatus as claimed in claim 4 in which said conveyor comprises bars which engage bosses provided on the bottoms of said containers for driving the containers.

6. An apparatus as claimed in claim 1, in which said oven is a tunnel with an inlet end and an outlet end, and said support means is in the form of panels or plates mounted on slides.

7. An apparatus as defined in claim 1 wherein said programming means comprises means for electrically energizing said emitters, said energizing means including electrical control means for reducing the heat intensity of said emitters during said stabilization period.

8. An apparatus as defined in claim 7 wherein said control means deenergizes said heating means during said stabilization period.

9. An apparatus as defined in claim 8 wherein said energizing means includes at least one electric circuit, and said control means includes a switch in said circuit for opening and closing the latter, and timing means for controlling operation of said switch.

10. An apparatus as claimed in claim 9 in which said oven is a tunnel oven with an inlet end and an outlet end, the emitters being distributed in the oven between these ends, and the control means comprise a switch enabling the circuit supplying all the emitters situated in about two-thirds the length of the oven from the outlet end to be cut off.

11. An apparatus as defined in claim 1 wherein the walls of said container are 3 to 5 mm. thick.

12. An apparatus as defined in claim 1 wherein said oven is a tunnel oven, and wherein said programming means comprises means for carrying said container along a path through said tunnel oven, said emitters being distributed along said path according to the desired program.